United States Patent [19]

Wu

[11] Patent Number: 5,378,035
[45] Date of Patent: Jan. 3, 1995

[54] AUTOMOBILE SUNSHADE

[76] Inventor: Cheng-Ju Wu, P.O. Box 82-144 Taipei, Taiwan, Prov. of China

[21] Appl. No.: 161,578

[22] Filed: Dec. 6, 1993

[51] Int. Cl.⁶ .............................................. B60J 11/00
[52] U.S. Cl. ...................................... 296/136; 296/98; 150/166
[58] Field of Search ................. 296/136, 95.1, 98; 135/88; 150/166, 168

[56] References Cited

U.S. PATENT DOCUMENTS

| | | | |
|---|---|---|---|
| 3,992,053 | 11/1976 | Hrytzak et al. | 296/136 X |
| 4,684,165 | 8/1987 | Becker | 296/136 |
| 4,727,898 | 3/1988 | Guma | 296/136 X |
| 4,858,985 | 8/1989 | Wojcik | 296/136 |
| 4,966,406 | 10/1990 | Karasik et al. | 296/136 X |
| 5,029,933 | 7/1991 | Gillem | 296/95.1 X |
| 5,040,557 | 8/1991 | Morgan | 296/136 X |
| 5,078,446 | 1/1992 | Walter | 296/136 X |
| 5,087,092 | 2/1992 | Antopolsky et al. | 296/95.1 |
| 5,242,205 | 9/1993 | Garner | 296/136 |

FOREIGN PATENT DOCUMENTS

| | | | |
|---|---|---|---|
| 2134638 | 2/1973 | Germany | 296/136 |
| 143218 | 6/1986 | Japan | 296/136 |
| 215623 | 8/1989 | Japan | 296/136 |

Primary Examiner—Joseph Pape
Attorney, Agent, or Firm—Osbert International Co.

[57] ABSTRACT

An automobile sunshade assembly including a winding device including an axle assembly on which is wound a curtain having a rod at the outer edge, said rod being provided with a plurality of hooks, said axle assembly having a right end connected with a first bearing connected with a first wire element provided with a planar member and a left end formed with a slot connected with a left hook end of a spring, said axle assembly further having a second wire element provided with a horizontal portion having a stop at the right end and a planar member at the left end and a second bearing connected with the left end of said axle assembly and a sleeve, the stop of said axle assembly being engaged with the right hook end of said spring, a casing for receiving said axle assembly, a base tray for receiving said casing, four supporting brackets each provided on the top with a rotatable rod and a plurality of magnets on the bottom, and two bands each having a rod at both sides for engaging with doors of the automobile, whereby the automobile can be effectively kept off from the sun.

1 Claim, 7 Drawing Sheets

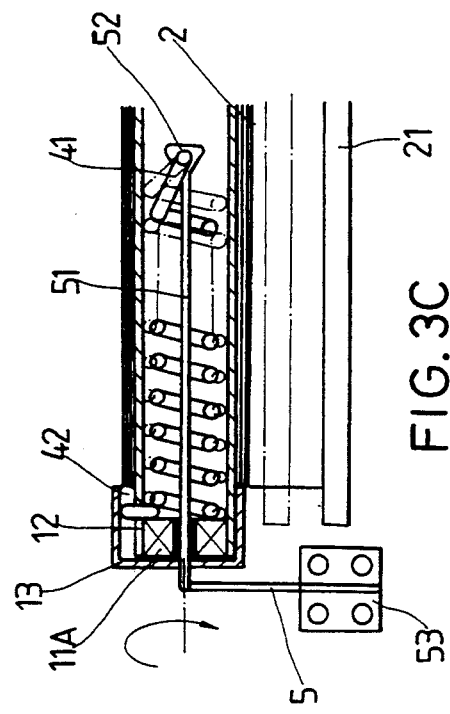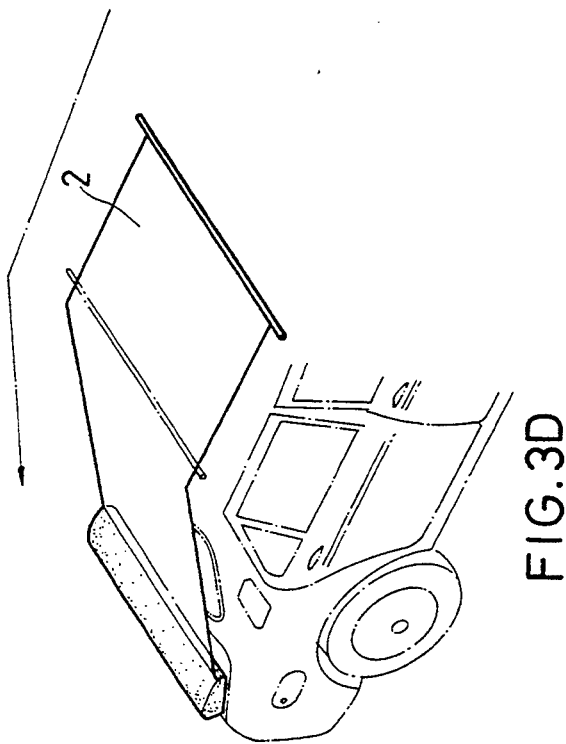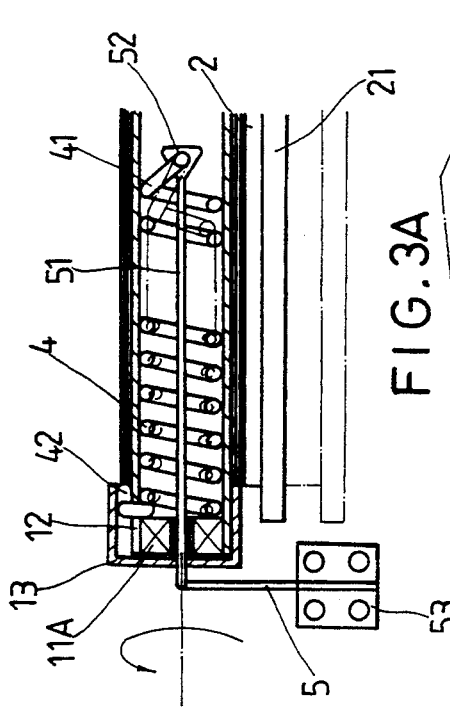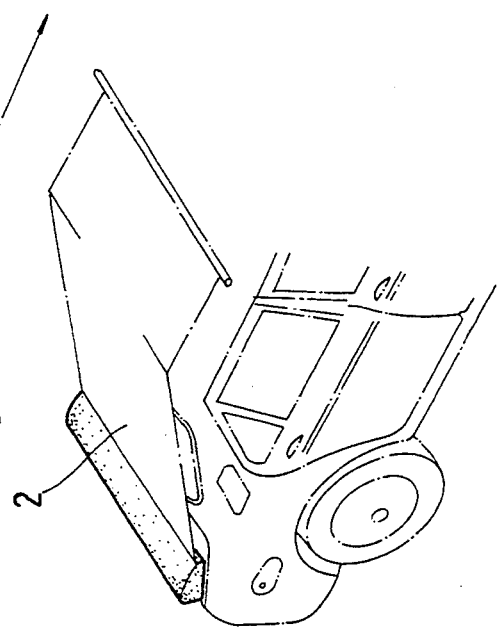

AUTOMOBILE SUNSHADE

BACKGROUND OF THE INVENTION

It has been found that the conventional sunshade for automobiles is simply a screen designed to be mounted across the inner side of the windshield of an automobile. However, as such a sunshade for automobiles is disposed within an automobile, it can only keep the steering wheel and the front seats from direct sunlight, but is of no use as to the decrease of the temperature inside the automobile.

Therefore, it is an object of the present invention to provide an automobile sunshade which may obviate and mitigate the above-mentioned drawbacks.

SUMMARY OF THE INVENTION

This invention relates to an improved automobile sunshade.

It is the primary object of the present invention to provide an automobile sunshade which can effectively keep an automobile from the sun.

It is another object of the present invention to provide an automobile sunshade which is easy to operate.

It is still another object of the present invention to provide an automobile sunshade which is simple in construction.

It is still another object of the present invention to provide an automobile sunshade which is fit for practical use.

It is a further object of the present invention to provide an automobile sunshade which is economic to produce.

Other objects and merits and a fuller understanding of the present invention will be obtained by those having ordinary skill in the art when the following detailed description of the preferred embodiment is read in conjunction with the accompanying drawings wherein like numerals refer to like or similar parts.

BRIEF DESCRIPTION OF THE DRAWINGS

FIGS. 3A, 3B, 3C and 3D show the working principle of the present invention.

DETAILED DESCRIPTION OF THE PREFERRED EMBODIMENT

Figure 1:
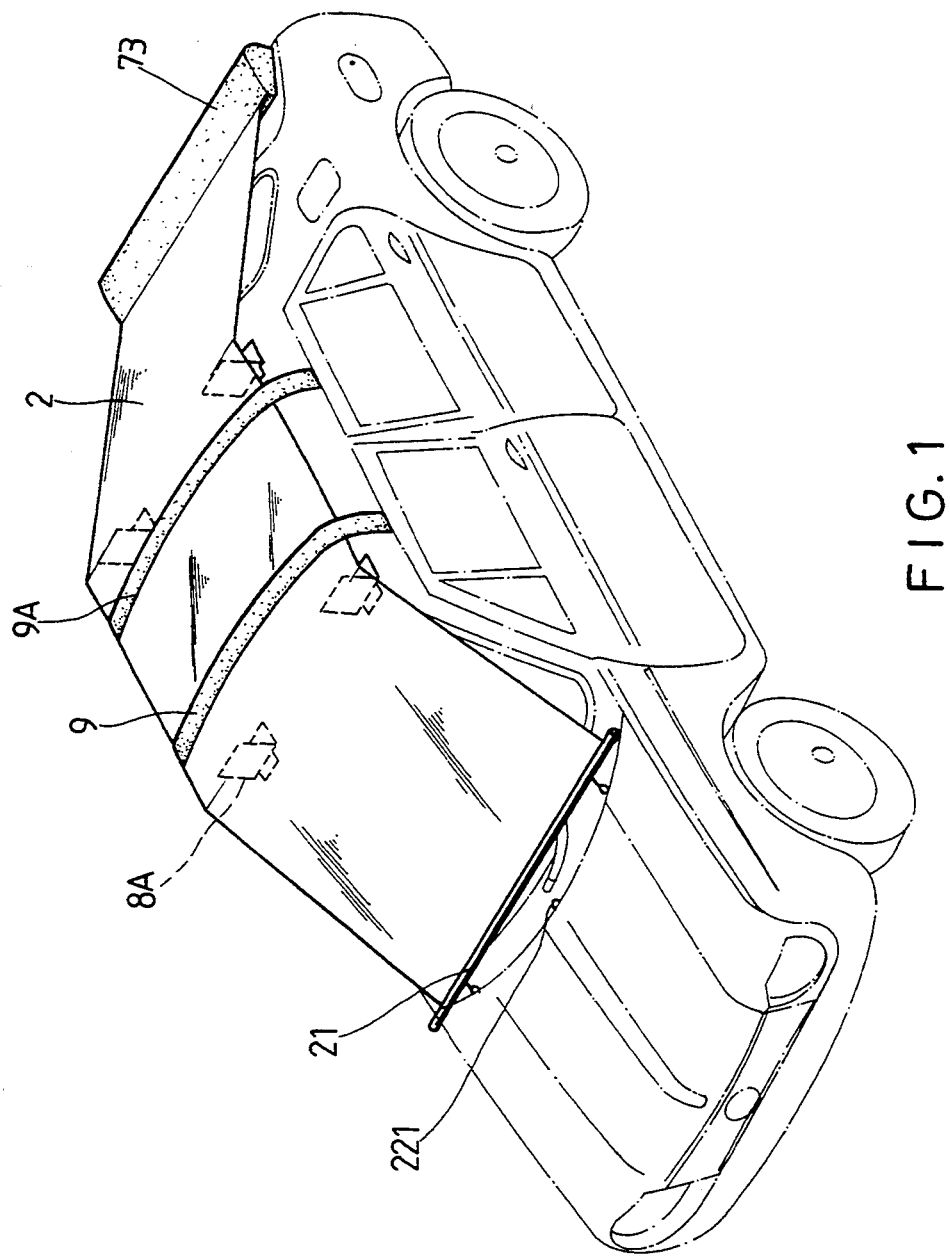
FIG. 1 is a working view of the present invention.

For purpose of promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 2:
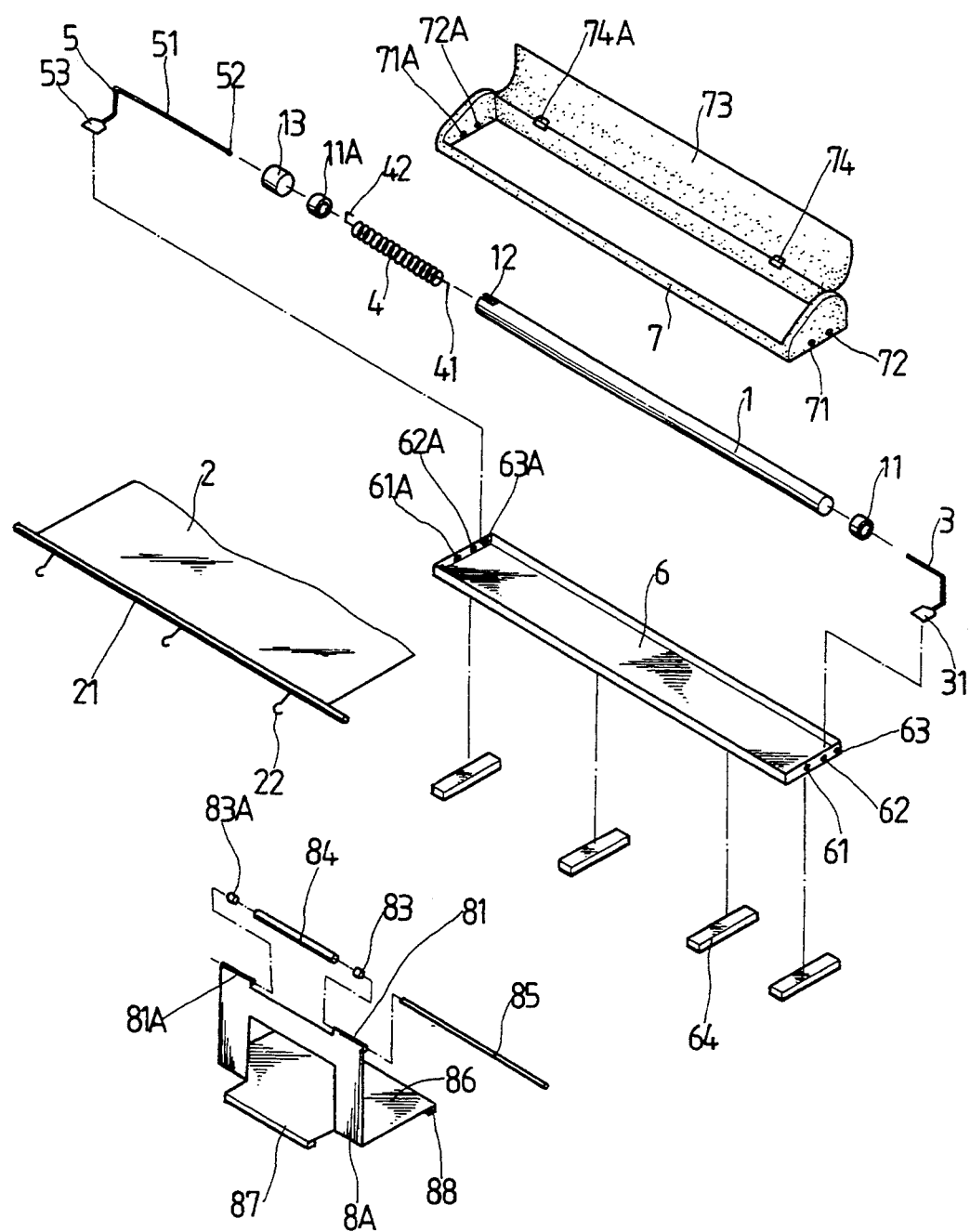
FIG. 2 is an exploded view of the present invention.

With reference to the drawings and in particular To FIGS. 1 and 2 thereof, the automobile sunshade assembly according to the present invention comprises a winding device having an axle assembly 1 on which is wound a curtain 2 having a rod 21 at the outer edge. The rod 21 is provided with a plurality of hooks 22. The right end of the axle assembly 1 is connected with a first bearing 11 which is in turn connected with a first wire element 3 provided with a planar member 31. The left end of the axle assembly 1 is formed with a slot 12 connected with a left hook end 41 of a spring 4. A second wire element 5 provided with a horizontal portion 51 having a stop 52 at the right end and a planar member 53 at the left end is connected with the right hook end 41 of the spring 4. A second bearing 11A is connected with the left end of the axle assembly 1 and is engaged with a sleeve 13. The axle assembly 1 is disposed within a base tray 6 formed with two holes 61 and 62 and a drain hole 63 at the right side and two holes 61A and 62A and a drain hole 63A at the left side. The base tray 6 is mounted on the bottom of a casing 7 having two holes 71 and 72 at the left side, two holes 71A and 72A at the other side, and a cover 73 connected with the casing by hinges 74 and 74A. At the bottom of the base tray 6 there are a plurality of adhesive pads 64 for keeping the base tray 6 on the trunk cover of an automobile. Each of the brackets 8A, 8B, 8C and 8D comprises a base plate 86, a protruded plate 87, two tubular shoulders 81 and 81A, a tubular member 84 fitted between the two tubular shoulder 81 and 81A, a first bearing 83 mounted at one end of the tubular member 84, a second bearing 83A mounted another end of the tubular member 84, and a shaft 85 extending into the tubular shoulders 81 and 81A, the tubular member 84, and the bearings 83 and 83A. Further, the bottom of the supporting brackets 8A, 8B, 8C and 8D is provided with a plurality of magnets 88 for keeping the brackets on the top of an automobile.

Looking now at FIGS. 3-7, when the cover 73 is oven and the curtain 2 is pulled out, the curtain 72 will apply a force on the axle 1 which will then exert a force on the spring 4 thereby deforming the spring 4 and storing energy in the spring 4. Then, the curtain 2 is further pulled out to go along the tubular members 84 of the supporting brackets 8A, 8B, 8C and 8D mounted on the top of the automobile to the engine cover to engage the hooks 22 with the rings 221 on the engine cover. Hence, the automobile can be kept off from the sun and the distance between the curtain 2 and the top of the automobile can cause air convection thus lowering the temperature.

Figure 4:
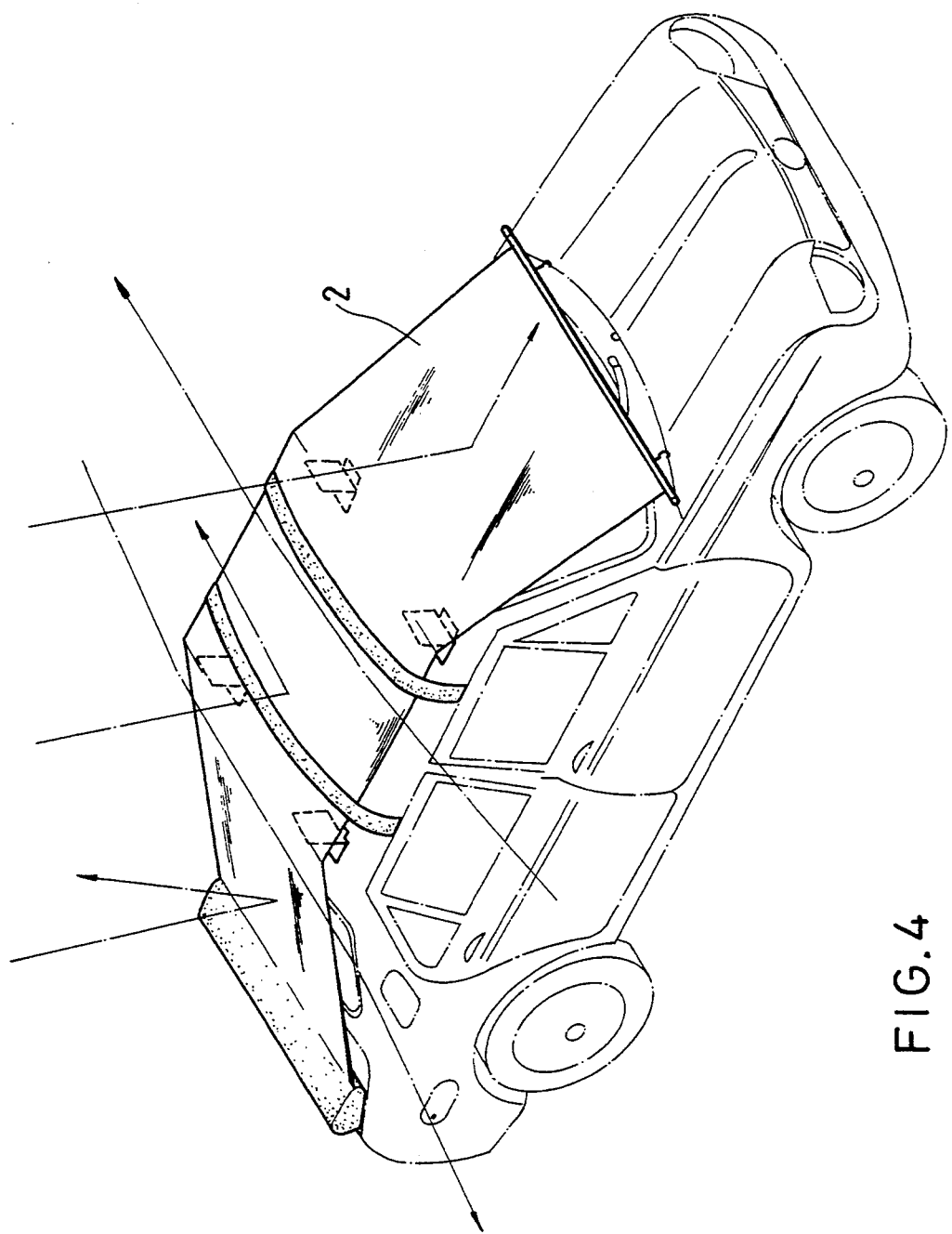
FIG. 4 shows the way how the present invention works.
Figure 5:
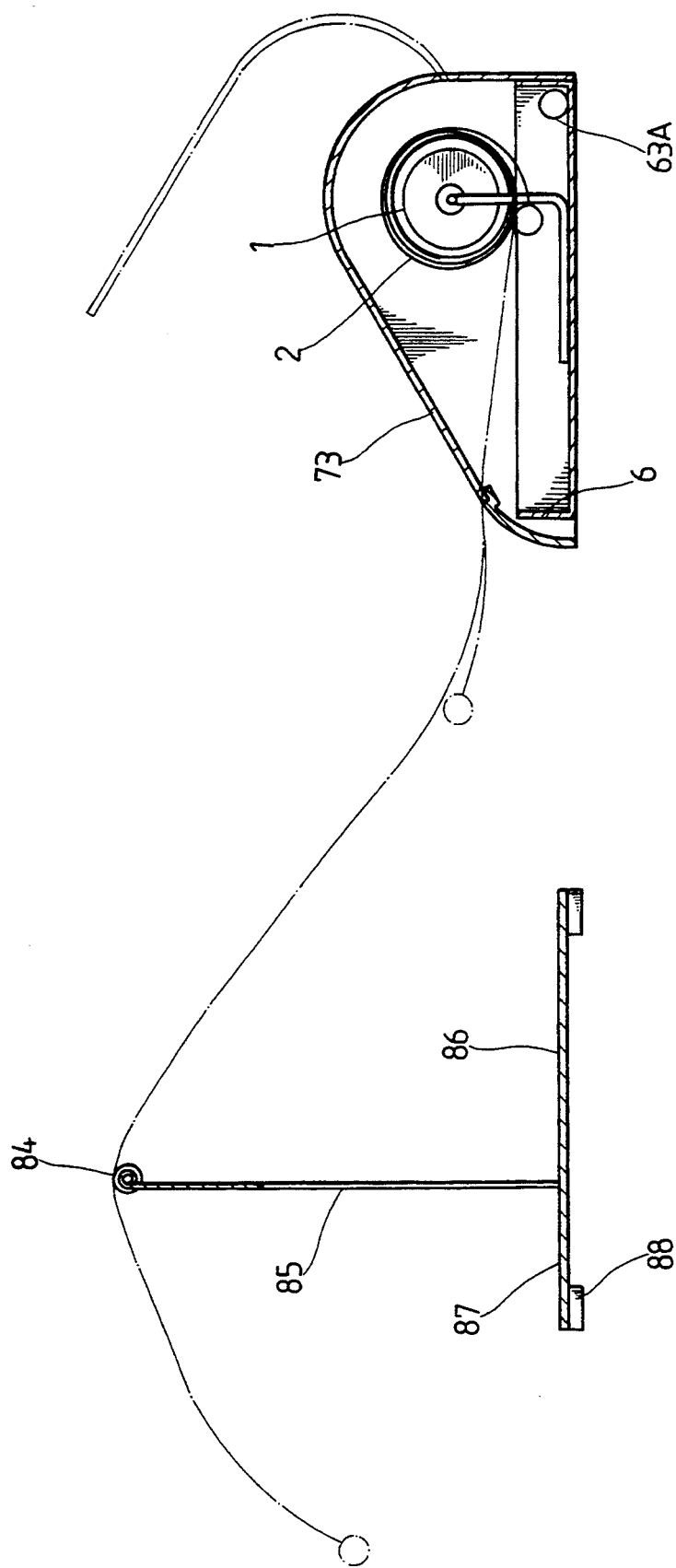
FIG. 5 is a sectional view showing that the curtain is being pulled over the supporting bracket.

Referring to FIGS. 1 and 4, the curtain 2 can be further kept in a steady position by engaging two bands 9 and 9A each having a first rod member 91 at one end and a second rod member 91A at another end across the top of the curtain and clamped by the doors.

When not in use, it is only necessary to detach the hooks 22 from the rings 221 and the spring 4 will pull back the curtain 2 (see FIGS. 3C and 3D).

Figure 6:
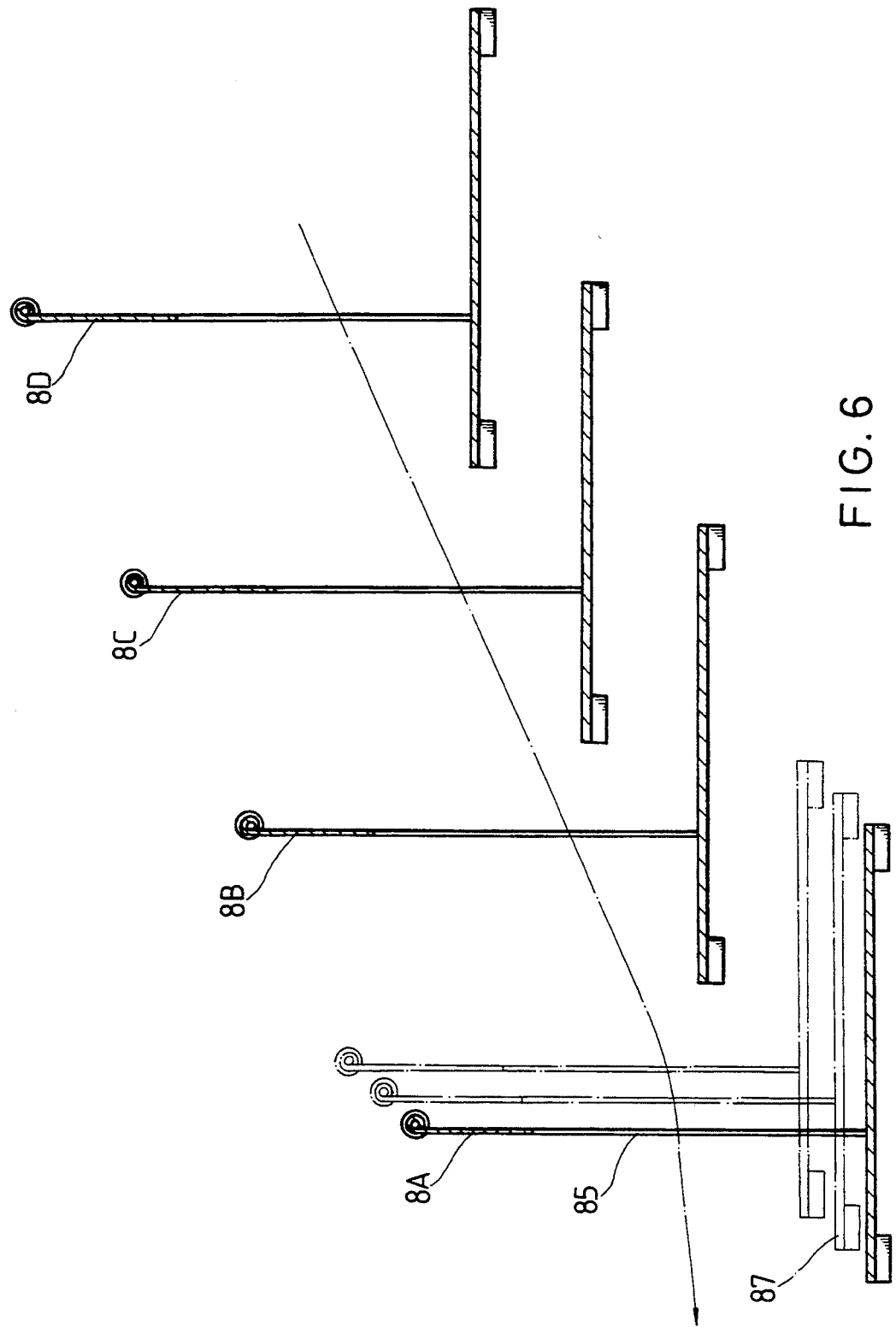
FIG. 6 shows the way how to pile up the supporting bracket.
Figure 8:
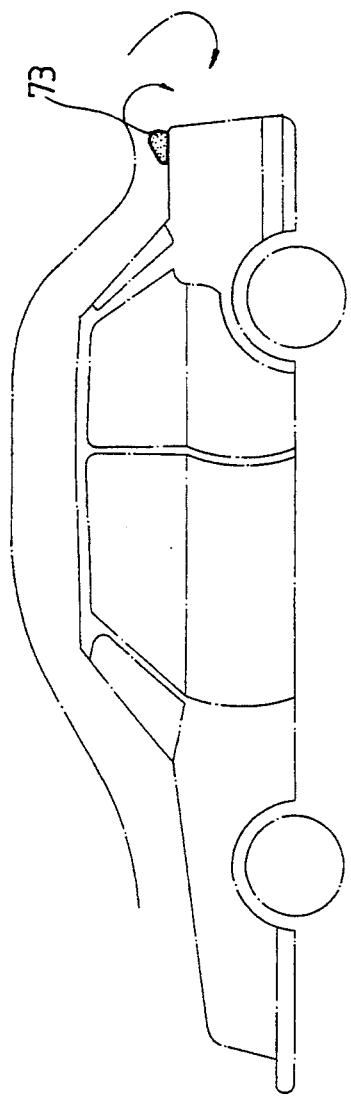
FIG. 8 shows the way how the present invention works as a spoiler.
Figure 7:
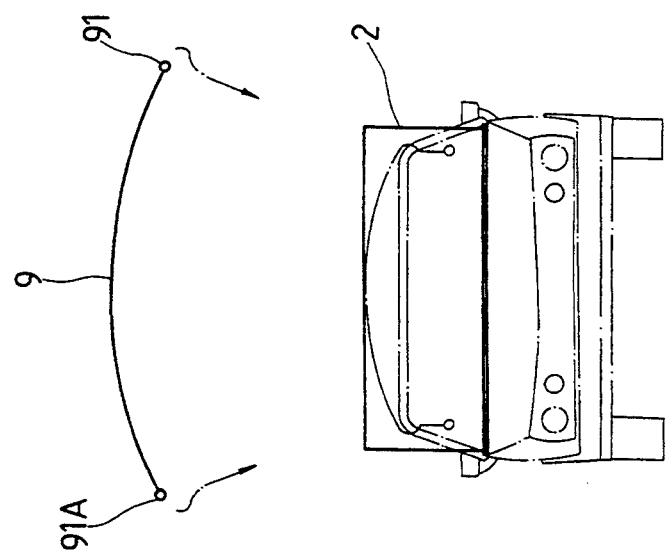
FIG. 7 shows the positioning of bands for holding the curtain in position on the automobile.

Further, the supporting brackets 8A, 8B, 8C and 8D can be piled up on another as shown in FIG. 6. In addition, the present invention can be also used as a spoiler (see FIG. 8).

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. An automobile sunshade assembly comprising:

a winding device including an axle assembly on which is wound a curtain having a rod at the outer edge, said rod being provided with a plurality of hooks, said axle assembly having a right end connected with a first bearing connected with a first wire element provided with a planar member and a left end formed with a slot connected with a left hook end of a spring, said axle assembly further having a second wire element provided with a horizontal portion having a stop at the right end and a planar member at the left end and a second bearing connected with the left end of said axle and a sleeve, the stop of said axle assembly being engaged with the right hook end of said spring, a casing for receiving said axle assembly, a base tray for receiving said casing;

four supporting brackets each provided with a rotatable rod along the top of each bracket and a plurality of magnets along the bottom of each bracket, said brackets being used for supporting said curtain; and two bands each having a rod at both ends thereof for keeping said curtain on an automobile and engaging with doors of the automobile.

* * * * *